US009185353B2

(12) United States Patent
Mestha et al.

(10) Patent No.: US 9,185,353 B2
(45) Date of Patent: Nov. 10, 2015

(54) REMOVING ENVIRONMENT FACTORS FROM SIGNALS GENERATED FROM VIDEO IMAGES CAPTURED FOR BIOMEDICAL MEASUREMENTS

(75) Inventors: Lalit Keshav Mestha, Fairport, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 911 days.

(21) Appl. No.: 13/401,207

(22) Filed: Feb. 21, 2012

(65) Prior Publication Data

US 2013/0215244 A1    Aug. 22, 2013

(51) Int. Cl.
*H04N 7/18* (2006.01)
*G06T 5/00* (2006.01)

(52) U.S. Cl.
CPC *H04N 7/18* (2013.01); *G06T 5/002* (2013.01); *G06T 5/003* (2013.01); *G06T 2207/10016* (2013.01); *G06T 2207/10024* (2013.01); *G06T 2207/10048* (2013.01); *G06T 2207/20056* (2013.01); *G06T 2207/20076* (2013.01); *G06T 2207/20144* (2013.01); *G06T 2207/30088* (2013.01)

(58) Field of Classification Search
CPC ......... A61B 1/041; A61B 1/0036; H04N 7/18
See application file for complete search history.

(56) References Cited

U.S. PATENT DOCUMENTS

2010/0198027 A1*  8/2010  Dixon ............................ 600/323
2011/0251493 A1* 10/2011  Poh et al. ...................... 600/477

OTHER PUBLICATIONS

Wei Lu et al., "Approach and Applications of Constrained ICA", IEEE Transactions on Neural Networks, vol. 16, No. 1, Jan. 2005.
Wei Lu, et al., "Constrained Independent Component Analysis", School of Computer Engineering, Nanyang Technological University, Singapore 639798.
Takano, et al., "Heart rate measurement based on a time-lapse image", Medical Engineering & Physics 29 (2007), pp. 853-857, www.sciencedirect.com.
Poh, et al., "Non-contact, automated cardiac pulse measurements using video imaging and blind source separation.", May 10, 2010, vol. 18, No. 10 / Optics Express 10762.
(Continued)

*Primary Examiner* — William C Vaughn, Jr.
*Assistant Examiner* — Daniel Tekle
(74) *Attorney, Agent, or Firm* — Philip E. Blair; Fleit Gibbons Gutman Bongini & Bianco P.L.

(57) ABSTRACT

What is disclosed is a system and method for automatically removing undesirable periodic or random background noise from heart rate measurement signals obtained from a video camera, ambient illuminator and other unknown electromagnetic sources to improve the overall reliability of biomedical measurements. In one embodiment, a time varying video image acquired over at least one imaging channel of a subject of interest is received. The video images are then segmented into a first region comprising a localized area where plethysmographic signals of the subject can be registered and a second region comprising a localized area of the environment where the plethysmographic signals cannot be registered. Both of the regions are exposed to the same environmental factors. The segmented video signals are pre-processed and the processed signals are subtracted from each other to generate an environmentally compensated signal. The environmentally compensated signal is then communicated to a computer system.

25 Claims, 8 Drawing Sheets

(56) References Cited

OTHER PUBLICATIONS

J. Lee, et al., "Temporally constrained ICA-based foetal ECG separation", Electronics Letters, Oct. 13, 2005, vol. 41, No. 21.

Mestha et al., "Estimating Cardiac Pulse Recovery From Multi-Channel Source Data Via Constrained Source Separation", U.S. Appl. No. 13/247,683, filed Sep. 28, 2011.

Jean-Francois Cardoso, "Blind signal separation: statistical principles", pp. 1-16, (Official Version published as: Proceedings of the IEEE, vol. 9, No. 10, pp. 2009-2025, Oct. 1998).

Hyvarinen, et al., "Independent Component Analysis: Algorithms and Applications", Neural Networks Research Centre, Helsinki University of Technology, Finland, Neutral Networks, pp. 1-31, 13(4-5); 411-430, 2000.

Mestha et al., "Filtering Source Video Data Via Independent Component Selection", U.S. Appl. No. 13/281,975, filed Oct. 26, 2011.

Dalal et al. "Histograms of Oriented Gradients for Human Detection", Proceedings of the Conference on Computer Vision and Pattern Recognition, San Diego, California, USA, pp. 886-893, (2005).

\* cited by examiner

REMOVING ENVIRONMENT FACTORS FROM SIGNALS GENERATED FROM VIDEO IMAGES CAPTURED FOR BIOMEDICAL MEASUREMENTS

TECHNICAL FIELD

The present invention is directed to systems and methods for removing undesirable signals and background noise from signals generated from video images captured using a RGB camera or an Infrared (IR) camera for improved accuracy and reliability of biomedical measurements derived from those images.

BACKGROUND

Current Electro-Cardio Graphic (ECG) systems require the patient to be located in close proximity to the ECG machine obtaining measurements via electrodes attached to the skin. The adhesive electrodes can cause skin irritation, infection, discomfort, and other issues to the patient. This can especially be a problem to newborns with sensitive skin. Methods for non-contact cardiac pulse measurement based on imaging patients using RGB and/or multi-spectral infrared (IR) cameras have arisen in this art. By recording video images of the region of exposed skin where concentrations of blood vessels exist, small changes in pulsating inside blood vessels are registered as blood volume signals on detector arrays. These signals can comprise a mixture of patient plethysmographic signals (i.e., blood volume signals) along with other artifacts from the environment. The detector arrays also may register involuntary and voluntary bodily motions and muscle fluctuations. Biomedical signals can be corrupted by fluctuations in illumination source, electronic power line noise, periodic signals manifested by camera auto calibration, and the like. Unwanted signals are difficult to separate from desired signals when these have frequency components that are within the bandwidth of the frequency of the human heart rate. Therefore, a need exists to automatically compensate video images to enhance the signal quality required during estimation.

Accordingly, what is needed in this art are sophisticated systems and methods for removing undesirable periodic signals and random background noise from video images obtained from a RGB camera or an infrared (IR) camera for improved accuracy and reliability of biomedical measurements obtained from those captured signals.

INCORPORATED REFERENCES

The following U.S. patents, U.S. patent applications, and Publications are incorporated herein in their entirety by reference.

"Estimating Cardiac Pulse Recovery From Multi-Channel Source Data Via Constrained Source Separation", U.S. Pat. No. 8,617,081.

"Filtering Source Video Data Via Independent Component Selection", U.S. Pat. No. 8,600,213.

"*Blind Signal Separation: Statistical Principles*", Jean-Francois Cardoso, Proceedings of the IEEE, Vol. 9, No. 10, pp. 2009-2025, (October 1998).

"*Independent Component Analysis: Algorithms And Applications*", Aapo Hyvärinen and Erkki Oja, Neural Networks, 13(4-5), pp. 411-430, (2000).

"*Infrared Thermal Imaging: Fundamentals, Research and Applications*", Michael Vollmer, Klaus Peter Möllmann, Wiley-VCH; 1$^{st}$ Ed. (2010) ISBN-13: 978-3527407170.

BRIEF SUMMARY

What is disclosed is a system and method for removing undesirable periodic signals and random background noise from signals generated from video images captured from a RGB or infrared (IR) camera for improved accuracy and reliability of biomedical measurements.

One embodiment of the present system and method for removing environmental factors from video images captured by a non-contact imaging system involves the following. First, video images are captured of a subject of interest. The video comprises a time varying source video images acquired over at least one imaging channel. The acquired source signal can be any combination of: NIR signals, RGB signals, multi-spectral signals, and hyperspectral signals. The video images are segmented into two regions of interest, i.e., a first region being a localized area where plethysmographic signals of the subject can be registered, and a second region being a localized area of the environment where plethysmographic signals cannot be registered. Both of these regions have been exposed to the same environmental factors containing undesirable environmental factors such as periodic signals and random background noise. The segmented video images for each of the first and second ROIs are pre-processed by performing various image pre-processing steps to generate time-series signals and further source separation with blind source separation or by a constrained source separation. The pre-processed signals corresponding to each of the imaging channels are subtracted to generate corresponding environmentally compensated signals. The environmentally compensated signals are then communicated to a computing system to extract plethysmographic signals.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for removing undesirable periodic signals and random background noise from video images obtained from a RGB or multi-spectral IR camera for improved accuracy and reliability of biomedical measurements obtained from those captured signals.

It should be understood that one of ordinary skill in this art would be readily familiar with advance mathematical techniques involving matrix methods, independent component analysis, and data projection. One of ordinary skill would be familiar with the texts, "*Independent Component Analysis*", Wiley-Interscience, $1^{st}$ Ed. (2001), ISBN-13: 978-0471405405, and "*Independent Component Analysis: Principles and Practice*", Cambridge University Press; $1^{st}$ Ed. (2001), ISBN-13: 978-0521792981, which are incorporated herein in their entirety by reference.

Non-Limiting Definitiions

Figure 1:
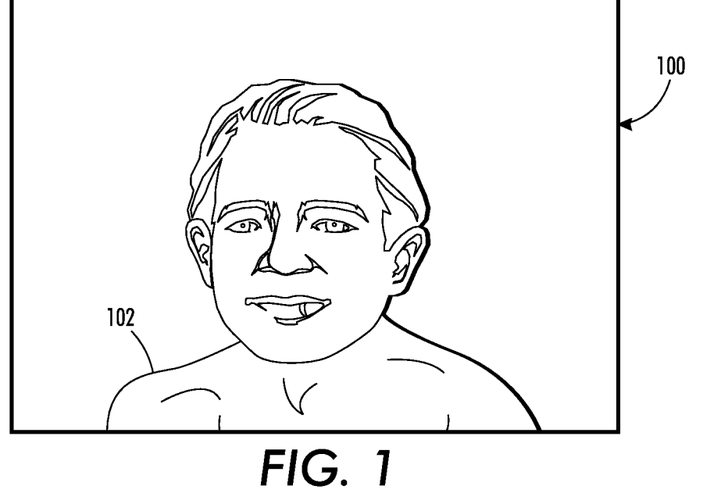
FIG. 1 shows a video image captured of a subject of interest.

A "subject of interest", as used herein, refers to a subject capable of registering a plethysmographic signal. FIG. 1 shows an example image 100 of a video taken of a subject of interest 102 for processing in accordance with the teachings hereof. Use of the term "human", or "person, or "patient" herein for explanatory purposes is not to be viewed as limiting the scope of the appended claims solely to human beings. The present method applies equally to other biological subjects capable of registering a plethysmographic signal in a captured video image such as mammals, birds, fish, reptiles, and certain insects.

A "plythesmographic signal" is a signal which contains meaningful data as to a physiological change in pulsating blood volume or volumetric pressure of the localized area of the subject intended to be analyzed. Pulmonary plethysmography measures the volume in the subject's lungs, i.e., lung volume. Plythesmography of the limbs helps determine circulatory capacity. Penile plethysmography measures changes in blood flow in the penis. Whole-body plethysmography helps practitioners measure a variety of parameters in their patients.

An "imaging sensor" is a device for capturing source video data over one or more channels of a subject of interest. The imaging sensor may be a device with a high frame rate and high spatial resolution such as, for example, a monochrome camera for capturing black/white video images, or a color camera for capturing color video images. The imaging sensor may be a spectral sensor such as a multi-spectral or hyperspectral system. Spectral sensors are devices which have relatively low frame rates and low spatial resolution but high spectral resolution. The imaging sensor may be a hybrid device capable of operating in a conventional video mode with high frame rate and high spatial resolution, and a spectral mode with low frame rates but high spectral resolution. Imaging sensors comprising standard video cameras and those comprising spectral sensors are readily available from many vendors in various streams of commerce.

A "source video image" is the time varying video image acquired using an imaging sensor. A source video image can be any combination of: NIR images, RGB images, RGB and NIR images, multi-spectral images, and hyperspectral video images.

A "time-series signal" is time varying signal obtained from the 2D video images by transforming to 1D during pre-processing.

Figure 2:
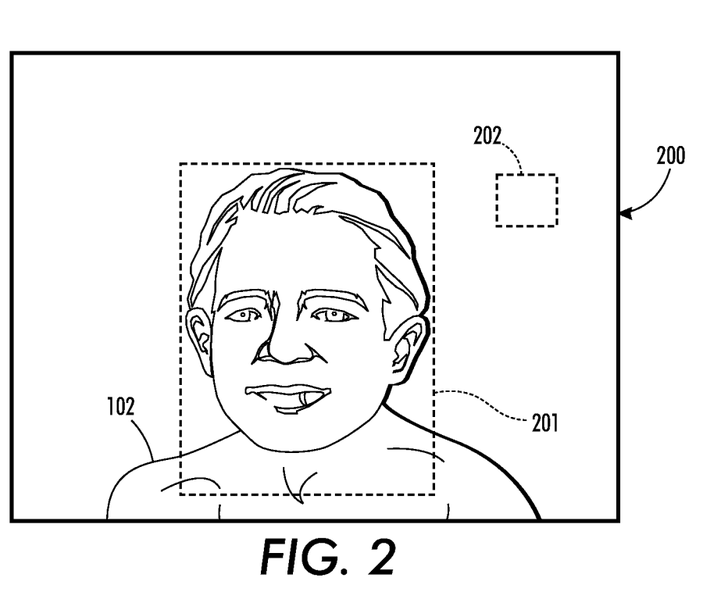
FIG. 2 shows the image of FIG. 1 with a first localized area 201 identified where the subject's plethysmographic signals are registered, and a second localized area 202 where those same signals are registered, i.e., a background area of the image.

"Segmenting the video image" means identifying, in the video images, a first region of interest comprising a localized area where the subject's plethysmographic signals can be registered (area 201 of image 200 of FIG. 2) and identifying a second region of interest comprising a localized area where the subject's plethysmographic signals cannot be registered (area 202). The localized areas do not have to be the same size, but both areas in the image need to have been exposed to the same environmental factors. Environmental factors include fluctuations in illumination source, electronic power line noise, periodic signals induced by the imaging system, and the like, which induce undesirable periodic signals and random background noise in the video. As discussed in the background section hereof, undesirable signals and background noise are difficult to separate from desired signals of interest when the undesirable signals have frequency components that are within the bandwidth of the frequency of the subject's plethysmographic signals intended to be accurately acquired for biomedical measurements. The teachings hereof are directed to processing video images such that the quality of the desired signals of interest is enhanced to improve the accuracy of the biomedical measurements derived therefrom.

"Subtracting the pre-processed signals" means subtracting the signals generated from pre-processed video images of the segmented region which does not contain the subject's plethysmographic signals from the signals generated from pre-processed video images which do contain the subject's plethysmographic signals (corresponding to each of the imaging channels used to acquire the source signals) to generate, for each channel, an environmentally compensated signal.

"Independent Component Analysis" (ICA) is a decomposition method for uncovering independent source signal components from a set of observations that are composed of linear mixtures of the underlying sources, called "independent components" of the observed data. ICA defines a generative model for the observed multivariate data, which is typically given as a large database of samples. In the model, the data variables are assumed to be linear mixtures of some unknown latent variables, and the mixing system is also unknown. The latent variables are assumed non-Gaussian and mutually independent, and they are called the independent components of the observed data. These independent components, also called sources or factors, can be found by ICA. ICA is superficially related to principal component analysis and factor analysis. ICA is a much more powerful technique, however, capable of finding the underlying factors or sources when these classic methods fail completely. The data analyzed by ICA could originate from many different kinds of application fields, including digital images, databases, psychometric measurements. In many cases, the measurements are given as a set of parallel signals or time-series. ICA is one form of blind source separation.

"Blind Source Separation" (BSS) is a technique for the recovery of unobserved source signals from a set of observed mixed signals without any prior information being known about the "mixing" process.

A "remote sensing environment" refers to non-contact, non-invasive sensing, i.e., the imaging sensor does not physically contact the subject being sensed. The environment may be any settings such as, for example, a hospital, ambulance, medical office, and the like.

Flow Diagram of One Example Embodiment

Figure 3:
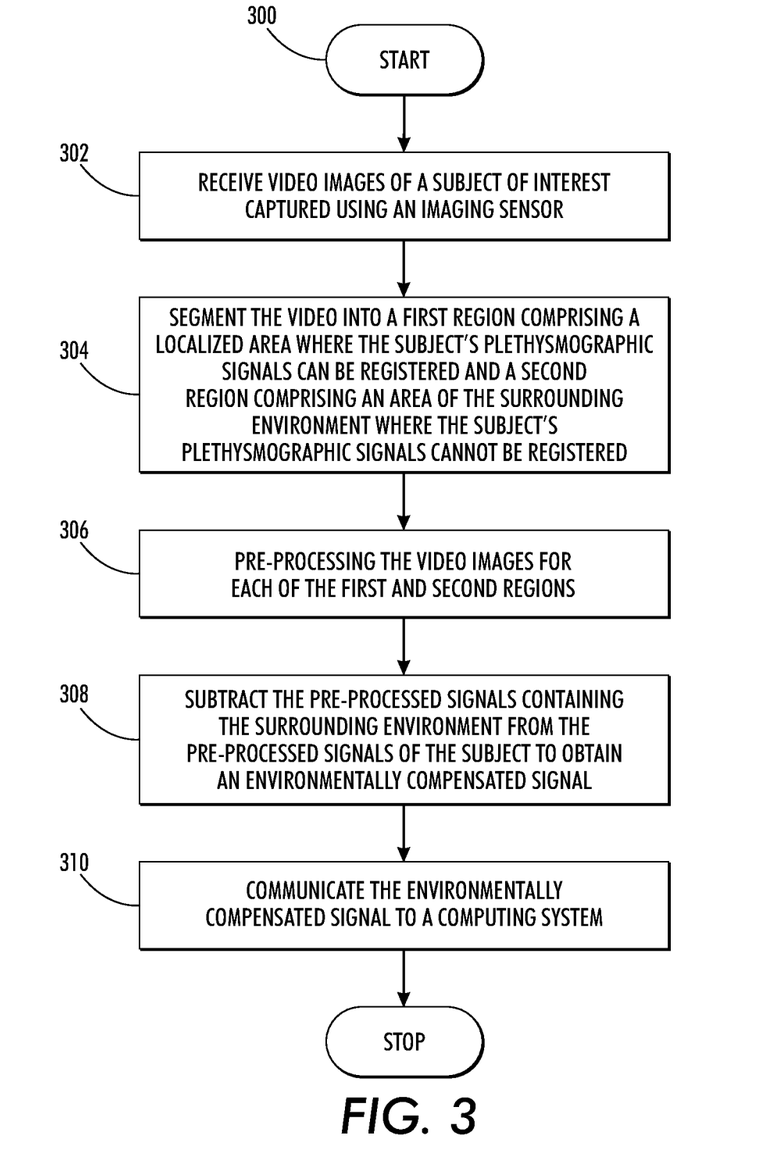
FIG. 3 is a flow diagram of one example embodiment of the present method for removing environmental factors from signals generated from video images captured by a non-contact imaging system in a remote sensing environment.

Reference is now being made to FIG. 3 which is a flow diagram of one example embodiment of the present method for removing environmental factors from signals generated from video images captured by a non-contact imaging system in a remote sensing environment. Flow processing begins at step 300 and immediately proceeds to step 302.

At step 302, receive video images captured of the subject of interest using an imaging sensor. The video images are pre-processed to compensate for motion blur, slow illumination variation induced color inconsistency, and any geometric distortion.

At step 304, segment the video images into at least two regions of interest with a first region of interest comprising a localized area where the subject's plethysmographic signals can be registered (such as the localized area of exposed skin 201 of FIG. 1, based on color, material, spatial features, and the like), and a second region of interest comprising the surrounding background environment where the subject's plethysmographic signals cannot be registered (such as localized background area 202 of FIG. 1). In advance of segmenting the video, the source signal may be processed to compensate for motion induced blur, imaging blur, and/or slow illuminant variation. This compensation is preferably carried out in a time-domain before performing a Fourier transform.

At step 306, pre-process the video images for each of the first and second regions of interest. Pre-processing includes at least one of a source separation with blind source separation, and/or a constrained source separation. In various embodiments, pre-processing includes performing, for each of the first and second regions, the following steps: 1) average the value of all pixels in this channel to obtain a channel average per image frame; 2) compute a global channel average and a global standard deviation; 3) subtract the channel average from the global channel average to produce a resulting signal; 4) divide the resulting signal by the standard deviation to obtain a zero-mean unit variance time-series signal; 5) normalize the time-series signal; 6) band pass filter the normalized time-series signal to remove undesirable frequencies which are below and above the expected frequencies of the subject; and 7) perform signal whitening. A Fourier Transform (or any other spectral analysis techniques such as Auto-regression Model) may be performed on the source signal to remove periodic noise in advance of performing the subtraction of step 308. It is to be noted that a sorting or phase problem may arise while processing each regions with the blind source separation method such as the independent component analysis which should be resolved prior to subtraction of source separated signals. Alternately, if sorting or phase problems persist then source separation can be carried out on the subtracted signals after performing signal whitening.

At step 308, subtract the pre-processed signal of the region containing the localized area of the surrounding background environment from the pre-processed signal of the region containing the subject's plethysmographic signals. This generates an environmentally compensated signal, for each channel.

At step 310, communicate the environmentally compensated signal to a computer system. In this embodiment, further processing stops.

In another embodiment, a set of reference signals having a frequency range which approximates a frequency range of the subject's cardiac pulse are generated. Then, using the reference signal, a constrained source separation is performed on the subtracted signals to obtain an estimated source signal with a minimum error. The minimum error is achieved by adjusting the phase of the estimated source signal and calculating a difference between the two waveforms. A cardiac frequency of the subject is then estimated based upon a frequency at which the minimum error was achieved. One or more aspects of the reference signal can be modified by changing a frequency, amplitude, phase, or the wave form of the reference signal where the wave form is a sine wave, a square wave, a user defined shape such as that obtained from an ECG signal, or a cardiac pulse wave form derived from the subject.

Example Signal Processing System

Figure 4:
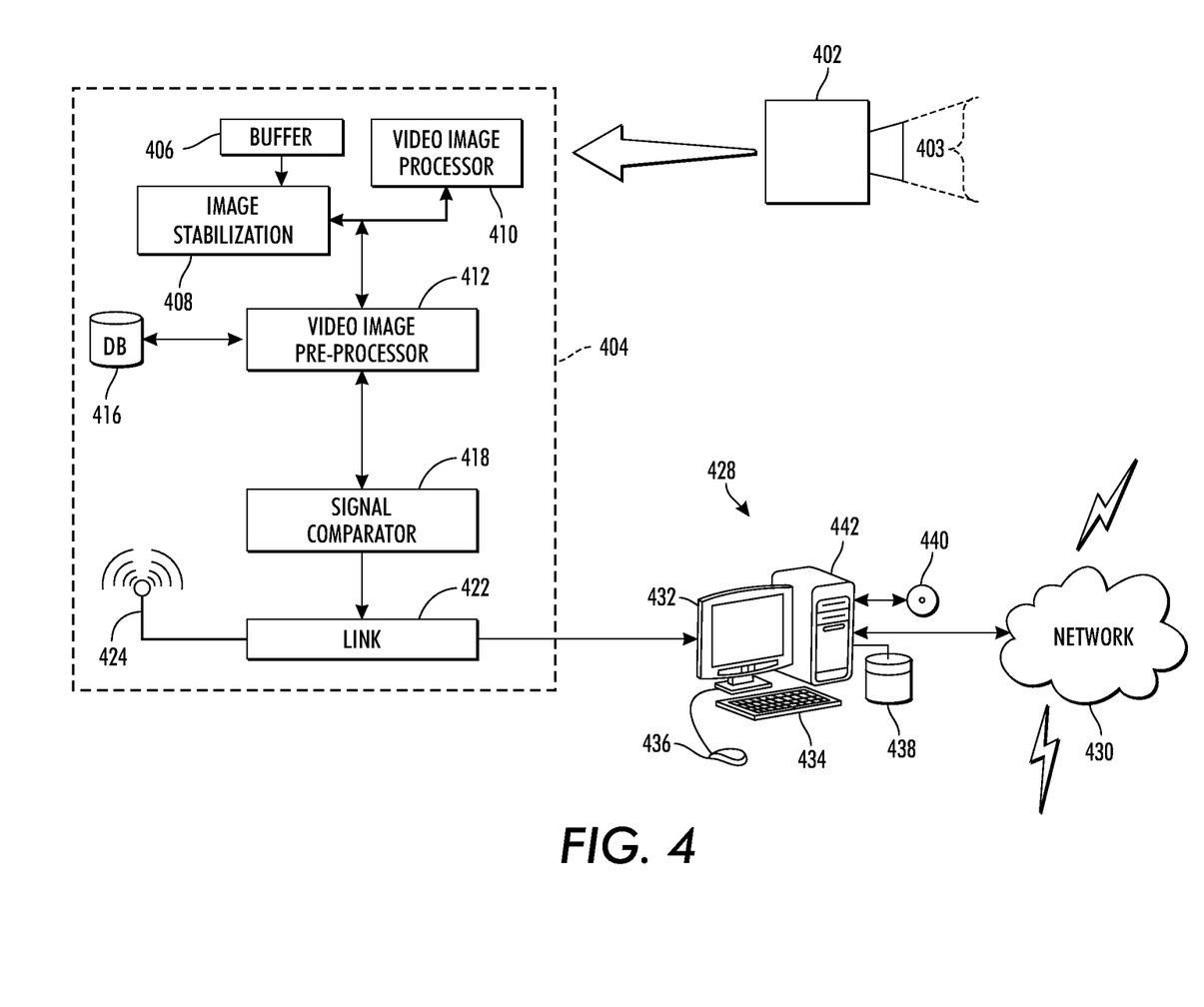
FIG. 4 is a block diagram of an example networked video image processing system wherein various aspects of the present method as described with respect to the flow diagram of FIG. 3 are implemented.

Reference is now being made to FIG. 4 which is a block diagram of an example networked video image processing system wherein various aspects of the present method as described with respect to the flow diagram of FIG. 3 are implemented.

In FIG. 4, imaging sensor 402 acquires source video images of a subject of interest in the sensor's field of view 403 over at least one imaging channel. The source video images are communicated to Video Image Processing System 404 wherein various aspects of the present method are performed. The example image processing system is shown comprising a Buffer 406 for buffering frames of the source video image for processing. Buffer 406 may further store data, formulas and other mathematical representations as are necessary to process the source video images in accordance with the teachings hereof. Image Stabilizer Module 408 is provided to process the images to compensate for motion induced blur, imaging blur, slow illuminant variation, and the like. Video Image Processor 410 segments the video images into signals of a first localized area (such as localized area 201 of FIG. 2) where the subject's plethysmographic signals can be registered, and a second localized area (such as localized area 202 of FIG. 2) where the subject's plethysmographic signals cannot be registered. One or more frames of the source video captured of the subject of interest may be displayed on a display device such that the user or operator can select any of the first and second localized areas using, for example, a rubber-band box generated by a mouse-over operation. Source video images associated with each of the identified localized areas, for each of the acquiring channels, are provided to Video Image Pre-Processor 412 which receives the segmented source images of each localized area, pre-processes the segmented source images, converts to time-series signal and identifies the components of those signals by having performed a source separation with blind source separation, or a constrained source separation on the signals of each of the segmented regions for each imaging channel used to acquire those source images. If the sorting and phase problem cannot be fully resolved then source separation is performed after Signal Comparator 418. Various signal components may be stored/retrieved to storage device 416 using communication pathways not shown. Signal Comparator 418 receives the pre-processed signals for each region for each channel and subtracts the two signals from each other. A result of the subtraction is an environmentally compensated signal 420. Signal Communication Link 422 receives the signal 420 and provides the environmentally compensated signal to one or more remote devices via Transmission Antenna 424. Network Link 422 further provides the environmentally compensated signal 420 to computer system 428. Data is transferred between devices in a network in the form of signals which may be in any combination of electrical, electro-magnetic, optical, or other forms. Such signals are transmitted via wire, cable, fiber optic, phone line, cellular link, RF, satellite, or any other medium known in the arts.

In the embodiment shown, computer system 428 comprises a workstation. Networked workstation 428 includes a hard drive (internal to computer case 442) which reads/writes to computer readable media 440 such as a floppy disk, optical disk, CD-ROM, DVD, magnetic tape, etc. Case 442 also houses a motherboard with a processor and memory, a network card, graphics card, and the like, and other software and hardware. The workstation includes a user interface which comprises display 432 such as a CRT, LCD, touch screen, etc., mouse 435, and keyboard 434. It should be appreciated that the workstation has an operating system and other specialized software configured to display a variety of numeric values, text, scroll bars, pull-down menus with user selectable options, and the like, for entering, selecting, or modifying information displayed on display device 432. Various portions of the source video signals captured by sensor 402 may be communicated to workstation 428 for processing. It should be appreciated that some or all of the functionality performed by any of the modules and processing units of the signal processing system 404 can be performed, in whole or in part, by workstation 428. Workstation 428 is in communication with network 430 via a communications interface (not shown). A user or technician may use the keyboard 434 and mouse 436, to identify regions of interest, set parameters, select images for processing, view results, and the like. Any of these may be stored to storage device 438 or written to computer media 440 such as, for example, a CD-ROM drive, using a read/write device located in computer case 442. Any of the modules and processing units of FIG. 4 can be placed in communication with device 416 and may store/retrieve therefrom data, variables, records, parameters, functions, machine readable/executable program instructions required to perform their intended functions. Moreover each of the modules of system 404 may be placed in communication with one or more devices over network 430. Although shown as a desktop computer, it should be appreciated that computer system 428 can be any of a laptop, mainframe, server, or a special purpose computer such as an ASIC, circuit board, dedicated processor, or the like.

Performance Results

Figure 5A:
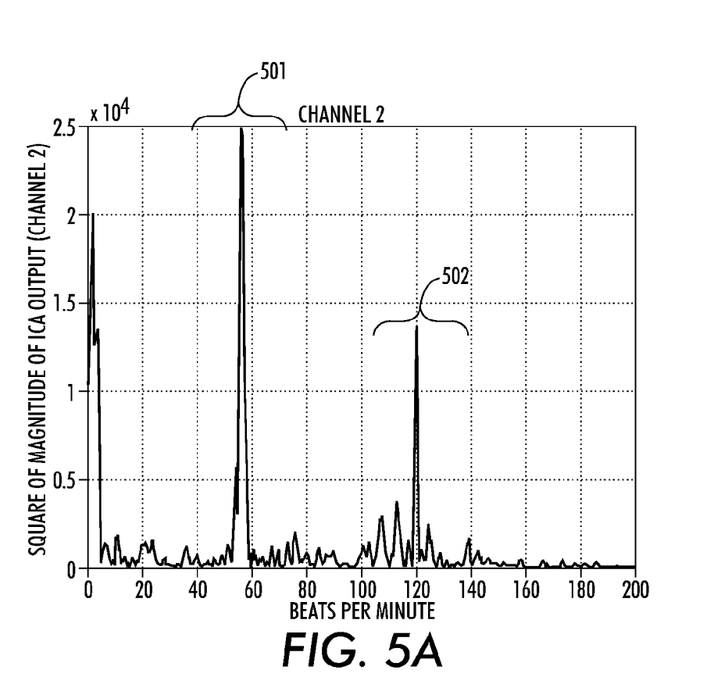
FIG. 5A plots the spectral content of a second imaging channel (post-ICA) of the imaging system used to acquire the source video images to isolate the components present in the segmented video images of the localized area 201 of FIG. 2.
Figure 5B:
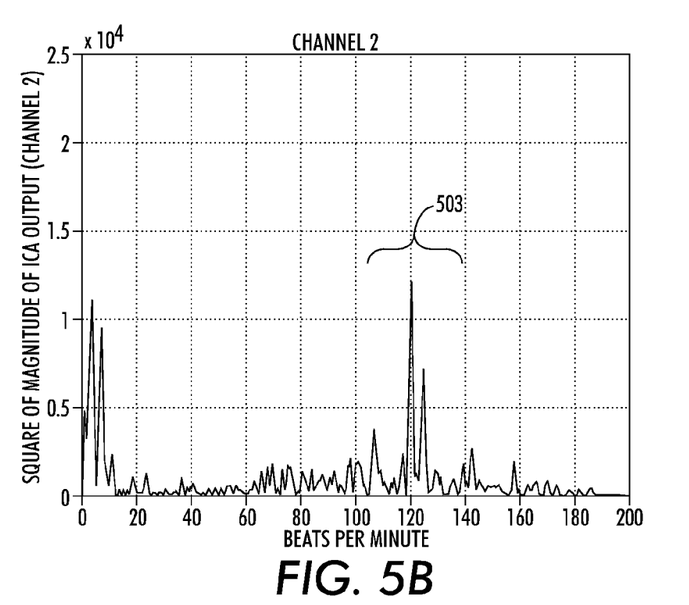
FIG. 5B plots the spectral content of a second imaging channel (post-ICA) of the imaging system used to acquire the source video images to isolate the signal components in the segmented source video images of the localized area 202 of FIG. 2 where the subject's plethysmographic signal cannot be registered.

Tests were performed using a 3 channel RGB video camera which produces a source video images containing camera-induced noise. Attention is directed to FIG. 5A which plots the power spectral density of the second channel from the segmented source video images of the localized area 201 of FIG. 2. Two dominant components are present, i.e., a first dominant signal component (at 501) comprises the subject's plethysmographic signal (at approximately 56 beats per minute (bpm)), and a second dominant component (at 502) comprises the undesirable camera-induced noise centered about 120 bpm. FIG. 5B plots the power spectral density of the same second channel (post-ICA) from the segmented source video images of the localized area 202 of FIG. 2 where the subject's plethysmographic signal cannot be registered. Notice that the subject's plethysmographic signal (around 56 bpm) does not appear indicating the non-existence of those signals in the background environment but that the localized area 202 does contain the undesirable signal (at 503) centered about 120 bpm.

Figure 6A:
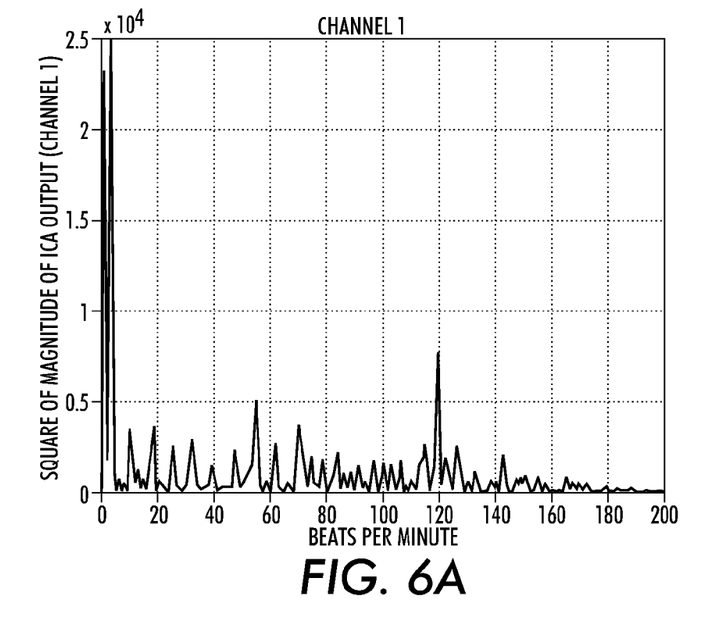
FIGS. 6A-C shows the power spectral density of the signals acquired for all three imaging channels before performing signal compensation.
Figure 6B:
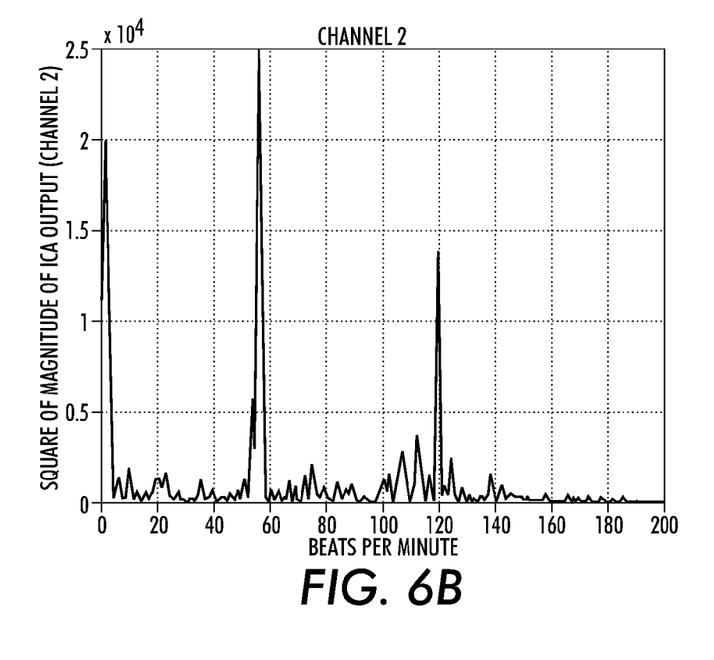
Figure 6C:
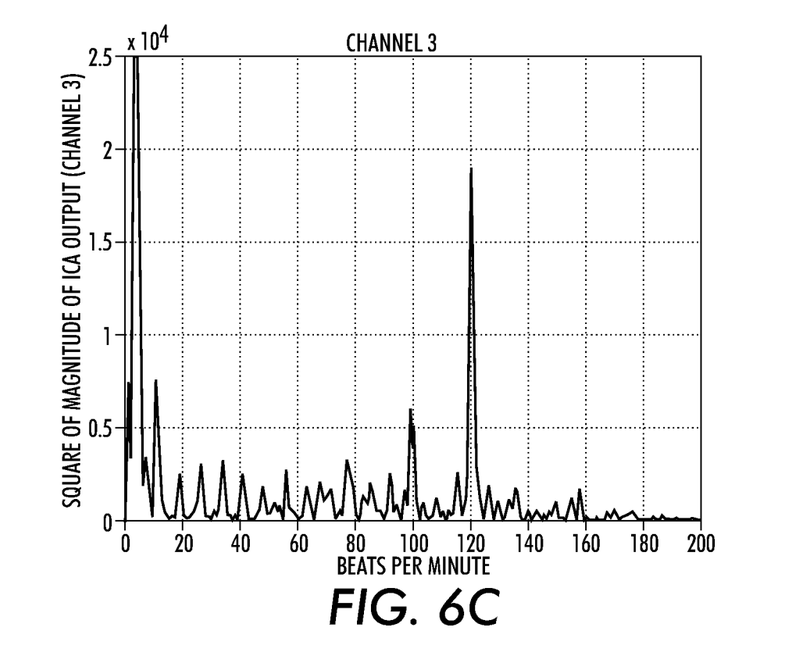
Figure 7A:
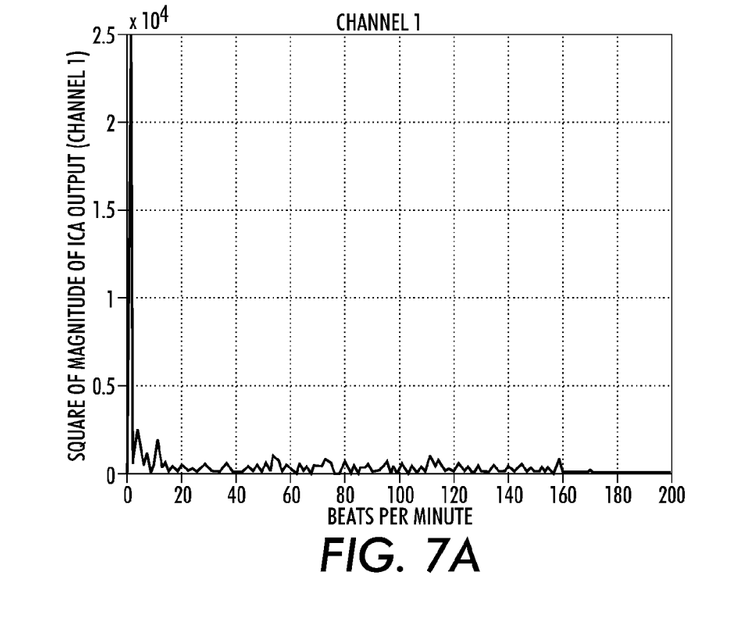
FIGS. 7A-C shows the power spectral density for the signals of the three imaging channels after compensating the source video image according to the teachings hereof.
Figure 7B:
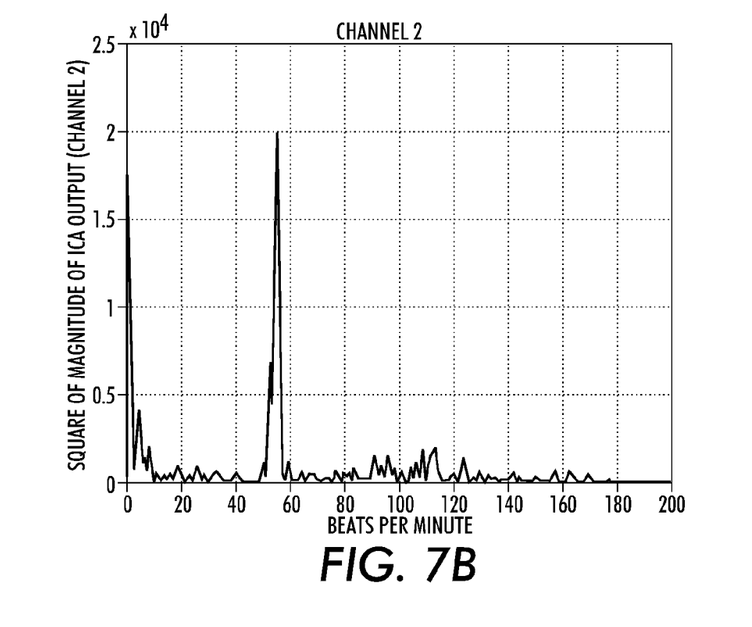
Figure 7C:
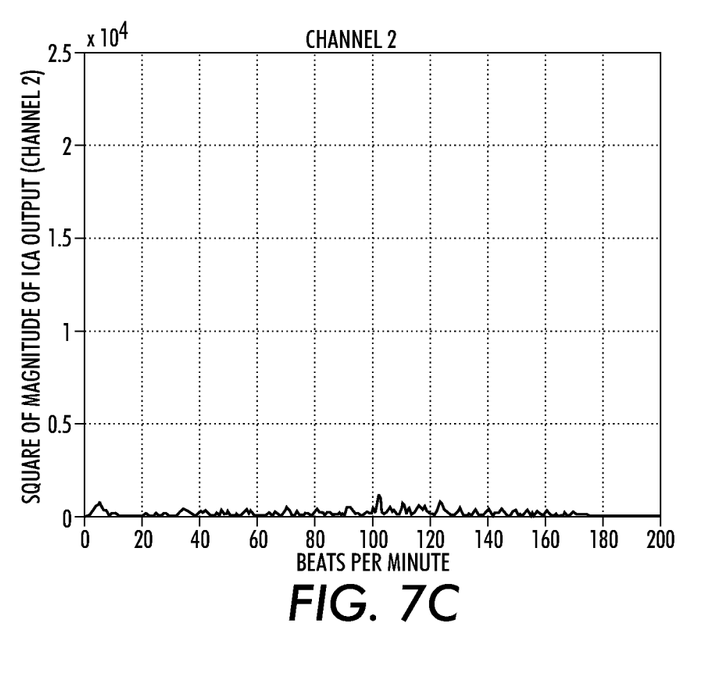

FIGS. 6A-C shows the power spectral density of the signals acquired for all three imaging channels before performing signal compensation as disclosed herein. FIGS. 7A-C shows the power spectral density for the signals of the three imaging channels after compensating the source video signal according to the teachings hereof. As shown, the undesirable camera-induced noise around 120 bpm (present in each of the three imaging channels) has been effectively eliminated while the subject's plethysmographic signal (dominant in the second channel) is largely retained. These clearly demonstrate the viability of the teachings disclosed herein. Moreover, various random signals on either side of subject's plethysmographic signal have been reduced as well.

Various Embodiments

It should also be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems operating in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network. The teachings hereof can be implemented in hardware or software using any known or later developed systems, structures, devices, and/or software by those skilled in the applicable art without undue experimentation from the functional description provided herein with a general knowledge of the relevant arts.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage media readable by a machine architecture or image processing system embodying executable program instructions capable of performing the methodology described in the flow diagrams. The article of manufacture may be included as part of an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for removing environmental factors from signals generated from video images captured by a non-contact imaging system in a remote sensing environment, the method comprising:
   receiving video images captured of a subject of interest, said video comprising a time varying source video image acquired over at least one imaging channel;
   segmenting said video images into a first region of interest comprising a localized area where plethysmographic signals of said subject can be registered and a second region of interest comprising a background area, both of said first and second regions being exposed to the same environmental factors;
   pre-processing said video images to generate a time-series signal for each of said first and second regions;
   subtracting said time-series signal corresponding to each of said first and second regions to obtain an environmentally compensated signal; and
   communicating said environmentally compensated signal to a computer system.

2. The method of claim 1, wherein pre-processing said video images is performed using at least one of: a source separation with blind source separation, and a constrained source separation.

3. The method of claim 2, wherein said pre-processing further comprises, for each channel:
   computing an average value of all pixels acquired with this channel to obtain a channel average per image frame;
   computing a global channel average and a global standard deviation from said computed averages for this channel;
   subtracting said channel average from said global channel average to produce a resulting signal;
   dividing said resulting signal by said standard deviation to obtain a zero-mean unit variance time-series signal for said region;
   normalizing said time-series signal; and
   band-pass filtering said normalized time-series signal to remove frequencies that are above and below expected frequencies of the plethysmographic signals of said subject.

4. The method of claim 1, wherein said acquired source video image comprises any combination of: NIR images, RGB images, RGB and NIR images, multi-spectral images, and hyperspectral video images.

5. The method of claim 1, wherein, in advance of segmenting said video images, further comprising compensating for any of: a motion induced blur, an imaging blur, and slow illuminant variation.

6. The method of claim 5, wherein said compensation is carried out in a time-domain before performing a Fourier transform such that both a periodic and a non-periodic background signal can be reduced.

7. The method of claim 1, further comprising performing a Fourier Transform on said source signal to remove periodic noise in advance of said subtraction.

8. The method of claim 1, further comprising:
   generating a set of reference signals having a frequency range which approximates a frequency range of said subject's cardiac pulse;
   performing, using said reference signal, a constrained source separation on said source data to obtain an estimated source signal with a minimum error; and
   estimating a cardiac frequency of said subject based upon a frequency at which said minimum error was achieved.

9. The method of claim 8, wherein said minimum error was achieved by adjusting phase of the estimated source signal and calculating a difference between two waveforms.

10. The method of claim 8, further comprising changing at least one aspect of said reference signal by changing any of: a frequency, an amplitude, a phase, and a wave form of said reference signal.

11. The method of claim 10, wherein said wave form comprises any of: a sine wave, a square wave, a user defined shape such as that obtained from an ECG signal, and a cardiac pulse wave form derived from said subject.

12. A system for removing environmental factors from signals generated from video images captured by a non-contact imaging system in a remote sensing environment, the system comprising:
   an imaging sensor for acquiring a time varying source video image acquired over at least one imaging channel; and
   a processor in communication with said imaging sensor and a memory, said processor executing machine readable instructions for performing:
      receiving video images captured of a subject of interest using said sensor;
      segmenting said video images into a first region of interest comprising a localized area where plethysmographic signals of said subject can be registered and a second region of interest comprising a background area, both of said first and second regions being exposed to the same environmental factors;
      pre-processing said video images to generate a time-series signal for each of said first and second regions;
      subtracting said time-series signal corresponding to each of said first and second regions to obtain an environmentally compensated signal; and
      communicating said environmentally compensated signal to a computer system.

13. The system of claim 12, wherein pre-processing said video images is performed using at least one of: a source separation with blind source separation, and a constrained source separation.

14. The system of claim 13, wherein said pre-processing further comprises, for each channel:
   computing an average value of all pixels acquired with this channel to obtain a channel average per image frame;
   computing a global channel average and a global standard deviation from said computed averages for this channel;
   subtracting said channel average from said global channel average to produce a resulting signal;
   dividing said resulting signal by said standard deviation to obtain a zero-mean unit variance time-series signal for said region;
   normalizing said time-series signal; and
   band-pass filtering said normalized time-series signal to remove frequencies that are above and below expected frequencies of the plethysmographic signals of said subject.

15. The system of claim 12, wherein said acquired source video image comprises any combination of: NIR images, RGB images, RGB and NIR images, multi-spectral images, and hyperspectral video images.

16. The system of claim 12, wherein, in advance of segmenting said video images, further comprising compensating for any of: a motion induced blur, an imaging blur, and slow illuminant variation.

17. The system of claim 16, wherein said compensation is carried out in a time-domain before performing a Fourier transform such that both a periodic and a non-periodic background signal can be reduced.

18. The system of claim 12, further comprising performing a Fourier Transform on said source signal to remove periodic noise in advance of said subtraction.

19. The system of claim 12, further comprising:
generating a set of reference signals having a frequency range which approximates a frequency range of said subject's cardiac pulse;
performing, using said reference signal, a constrained source separation on said source data to obtain an estimated source signal with a minimum error; and
estimating a cardiac frequency of said subject based upon a frequency at which said minimum error was achieved.

20. The system of claim 19, wherein said minimum error was achieved by adjusting phase of the estimated source signal and calculating a difference between two waveforms.

21. The system of claim 19, further comprising changing at least one aspect of said reference signal by changing any of: a frequency, an amplitude, a phase, and a wave form of said reference signal.

22. The system of claim 21, wherein said wave form comprises any of: a sine wave, a square wave, a user defined shape such as that obtained from an ECG signal, and a cardiac pulse wave form derived from said subject.

23. A computer implemented method for removing environmental factors from signals generated from video images captured by a non-contact imaging system in a remote sensing environment, the method comprising:
receiving video images captured of a subject of interest, said video comprising a time varying source video image acquired over at least one imaging channel, said acquired source video image comprising any combination of: NIR images, RGB images, RGB and NIR images, multi-spectral images, and hyperspectral video images;
segmenting said video images into a first region of interest comprising a localized area where plethysmographic signals of said subject can be registered and a second region of interest comprising a background area, both of said first and second regions being exposed to the same environmental factors;
pre-processing said video images to generate a normalized time-series signal for each of said first and second regions, said pre-processing including performing at least one of: a source separation with blind source separation, and a constrained source separation;
subtracting said normalized time-series signal corresponding to each of said first and second regions to obtain an environmentally compensated signal; and
communicating said environmentally compensated signal to a computer system.

24. The computer implemented method of claim 23, wherein said pre-processing further comprises, for each channel:
computing an average value of all pixels acquired with this channel to obtain a channel average per image frame;
computing a global channel average and a global standard deviation from said computed averages for this channel;
subtracting said channel average from said global channel average to produce a resulting signal;
dividing said resulting signal by said standard deviation to obtain a zero-mean unit variance time-series signal for said region;
normalizing said time-series signal; and
band-pass filtering said normalized time-series signal to remove frequencies that are above and below expected frequencies of the plethysmographic signals of said subject.

25. The computer implemented method of claim 23, further comprising:
generating a set of reference signals having a frequency range which approximates a frequency range of said subject's cardiac pulse;
performing, using said reference signal, a constrained source separation on said source data to obtain an estimated source signal with a minimum error, said minimum error being achieved by adjusting phase of the estimated source signal and calculating a difference between two waveforms; and
estimating a cardiac frequency of said subject based upon a frequency at which said minimum error was achieved.

* * * * *